MULTILAYER LENTICULAR LIGHT POLARIZING DEVICE

Original Filed Jan. 24, 1962 2 Sheets-Sheet 1

INVENTOR.
Howard G. Rogers
BY
Brown and Mikulka
ATTORNEYS

MULTILAYER LENTICULAR LIGHT POLARIZING DEVICE

Original Filed Jan. 24, 1962 2 Sheets-Sheet 2

INVENTOR.
Howard G. Rogers
BY
Brown and Mikulka
ATTORNEYS

United States Patent Office

Re. 26,506
Reissued Dec. 17, 1968

26,506
MULTILAYER LENTICULAR LIGHT POLARIZING DEVICE

Howard G. Rogers, Weston, Mass., assignor to Polaroid Corporation, Cambridge, Mass., a corporation of Delaware Original No. 3,213,753, dated Oct. 26, 1965, Ser. No. 168,398, Jan. 24, 1962. Application for reissue Dec. 27, 1965, Ser. No. 518,521
13 Claims. (Cl. 350—157)

Matter enclosed in heavy brackets [ ] appears in the original patent but forms no part of this reissue specification; matter printed in italics indicates the additions made by reissue.

*ABSTRACT OF THE DISCLOSURE*

*This disclosure relates to multilayer lenticular light polarizing devices and systems of high efficiency which transmit a very large portion of incident light.*

[This invention relates to light polarizing devices and systems of high efficiency which transmit a very large porportion of incident light.]

It is characteristic of the usual commercial sheet polarizer, in which a stain or dye is incorporated in a molecularly oriented light transmitting material, or in a material comprising oriented minute crystals, or in a material involving some other type of orientation, that losses through absorption in excess of one-half of the incident light accompany performance of the polarizing function. Such losses are generally undesirable and may prove to be a serious detriment where it is either impractical or impossible to increase the intensity of the light source to balance them.

While light polarizers other than the types above-mentioned and offering improved transmission characteristics have been developed such, for example, as the so-called interference polarizers and those comprising certain arrangements of refracting, doubly-refracting, lenticular, reflecting and retardation components, none of these latter forms has, to the best of applicant's knowledge, been particularly efficient or found employment on a commercial basis. Thus, for example, in U.S. Patent No. 2,180,114 there has been disclosed a structure in which a birefringent layer produces, relative to an incident collimated light beam, certain undeviated ray components in the same direction as that of the entering beam and other components which are diffused in various directions. A positive lenticular surface, located next to the birefringent layer, focuses the undeviated components on a plurality of half-wave retardation elements, located in an adjacent layer, to rotate their vibration direction so that it is similar to that of the diffused components. However, certain disadvantages exist in such a system, including the fact that in intentionally changing the vibration directions of the focused components, a portion of the diffused rays is also transmitted by the retardation elements and its polarizing direction is undesirably rotated too. Thus, the nonuniformity of the two components is perpetuated rather than corrected and the operational polarizing efficiency is impared. Furthermore, there is not complete collimation of the transmitted rays. Again, the structure involves a very small angular aperture so that incident light rays which are not collimated would not be focused on the retardation strips and proper operation would be seriously impaired.

The light polarizing devices of the present invention employ lenticular, doubly-refracting and retardation elements but distinguish structurally and functionally from those above mentioned and are characterized by a generally improved light polarizing efficiency. The light polarizers described herein are adapted to production methods of manufacture and may be produced on an economical basis in a convenient sheet- or film-like form of reasonably large area. They are believed to have particular utility in systems wherein a high degree of polarized light is required but where a high intensity light source is disadvantageous. Because of their improved transmission properties it is possible, in such instances, to use an accompanying light source of a lower rating than would otherwise be possible. Furthermore, by avoiding the use of a dye or stain there is no possibility of operational impairment through fading. Uses of the type contemplated include anti-glare headlamp systems for vehicles, monoscopic and stereoscopic projection systems, etc.

Accordingly, an object of the present invention is to provide a novel light polarizing device of high efficiency and wide utility which converts a large percentage of the incident light to polarized light and transmits it with substantially unreduced intensity.

Other objects are to provide a light polarizer of the character described which may be in the form either of a rigid or a flexible sheet material; to provide such a light polarizer which is adapted to be readily manufactured on an economical basis; to provide a light polarizing device through a novel combination of elements comprising isotropic, doubly-refracting, lenticular, retardation, prismatic and reflecting elements; to provide a light polarizing film material of the character described which is adapted, according to structural modification, to produce uniformly or differentially plane polarized light or circularly polarized light; and to provide a light polarizing device or system of the character described which includes a light source especially adapted for operation therewith.

Other objects of the invention will in part be obvious and will in part appear hereinafter.

The invention accordingly comprises the product possessing the features, properties and the relation of components which are exemplified in the following detailed disclosure, and the scope of the application of which will be indicated in the claims.

For a fuller understanding of the nature and objects of the invention, reference should be had to the following detailed description taken in connection with the accompanying drawing wherein.

As hereinbefore intimated, the present invention is primarily concerned with the end problem of providing, in practical and efficient form, what may be termed a "total transmission" light polarizer, namely, one which is particularly adapted to polarize a very large portion of incident light, for use in equipment such as may be employed for signaling, projection and display purposes, or the like, and in an antiglare system for automotive vehicles. The several structural examples of the light polarizing materials described herein permit a certain degree of latitude as to the nature of the light beams which undergo polarization. Thus, for example, collimated light beams may be provided by supplementary means of a system or by means incorporated with the light polarizing sheet material itself. The beams are converted to polarized rays of substantially undiminished intensity. The transmitted polarized light may be in the form of either collimated or non-collimated rays as desired, depending upon structural characteristics provided in the sheet material. Again, the transmitted rays may either be plane polarized and vibrating in a single given azimuth, or vibrating in predeterminedly different directions. Alternatively, they may be circularly polarized. With these general considerations in mind, the specific structures of the invention will now be described in detail.

Figure 1:
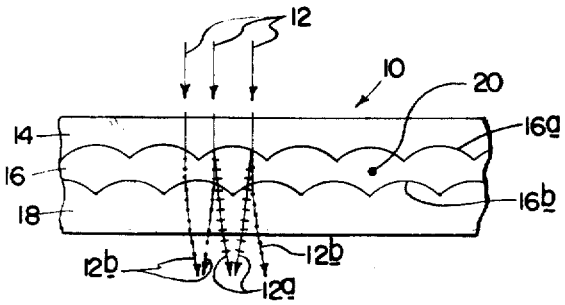
FIGURE 1 is a diagrammatic fragmentary edge view of a light polarizing sheet material of the present invention illustrating the transmission of light rays therethrough.

In FIGURE 1 there is shown, in considerably exaggerated dimensions, a light polarizing sheet material 10 as it would appear in elevation, namely, as viewed along a given edge. In order of arrangement with respect to the direction of a collimated beam 12 from a light source (not shown) the material is composed of an isotropic, or at least functionally isotropic layer 14 having a relatively low refractive index, a birefringent layer 16 and a functionally isotropic layer 18 having a relatively high refractive index, the layers preferably being laminated or bonded together to form a unitary structure. It is not essential to operability to have the layers bonded together, however, provided that the adjacent layer surfaces enclosing the air layer are maintained parallel to one another. One refractive index of the birefringent layer 16 matches that of layer 14 while the other refractive index thereof matches that of layer 18. For purposes of illustration, the aforesaid refractive indices may be taken as follows: the refractive index of layer 14 is 1.5; the two indices of layer 16 are 1.5 and 1.7; and the index of layer 18 is 1.7.

The interface between layers 14 and 16 is composed of a plurality of lens-like or lenticular elements 16a and the interface between layers 16 and 18 is composed of a plurality of lens-like or lenticular elements 16b. It will be noted that the lenticules of one interface are offset, laterally, with respect to those of the other. The term "lenticular," as employed herein, may broadly be interpreted as constituting a plurality of surface configurations, including the prismatic elements illustrated, as well as those of a strictly lens-like form. A certain degree of latitude is possible as to the choice of materials employed in forming the several layers. Thus, for example, layer 14 may suitably be composed of an isotropic plastic material as, for example, a methacrylate such as cyclohexylmethacrylate, having a refractive index of 1.52. Layer 16 may, appropriately, be composed of a plastic material as, for instance, of polyethylene terephthalate which has been rendered birefringent. A readily obtainable material of this composition, having refractive indices of 1.52 and 1.78 when thus rendered birefringent is one having the trade name "Mylar," sold by E. I. du Pont de Nemours Co., Wilmington, Del., U.S.A. Layer 18 is composed of or incorporates a transparent material having an index of refraction approximating the higher index of layer 16. One such material comprises a high concentration or proportion of potassium picrate, having a refractive index of 1.74, or of calcium cyanamide, having a refractive index of 1.77 in a suitable carrier such, for example, as polyvinyl carbazole having a refractive index of 1.68.

One method of constructing the sheet material 10 is to form the birefringent layer 16 by a casting, or a casting and embossing procedure, after its proper solidification, and casting the isotropic layers 14 and 18 on the opposite lenticular surfaces thereof. The birefringent layer 16, may be composed of substantially any material having a birefringence adapted to facilitate the required separation of light ray components and having indices of refraction which bear a proper relation to those of the contiguous layers 14 and 18. It may also be formed by any of several different procedures. Assuming, by way of illustration, that the birefringence of layer 16 is to be achieved through its molecular orientation, a sheet or film of properly deformable material, such as the aforementioned polyethylene terephthalate, namely, a sheet of a given length and a selected given thickness, is first extruded or cast. The sheet is then subjected to a mechanical stress in a longitudinal direction to elongate and molecularly orient it, as by a stretching operation in the presence of heat or other softening agent, or by a cold drawing method, or, again, by applying a mechanical stress to its surface. The direction of stretch or other application of orienting stress is to be taken as having been performed toward and away from the viewer, namely, in a direction normal to the plane of the paper. This being the case, the optic axis 20 of layer 16 constitutes a direction both in the plane of layer 16 and normal to the plane of the paper.

The birefringent layer 16, having acquired the desired birefringence as, for example, a birefringence of .2 assuming the stated refractive indices, is then subjected to surface modification to form thereon the converging or positive lenticular elements 16a and the diverging but functionally converging or positive lenticular elements 16b. This is performed by passing the material between embossing means such as embossing blades, wheels or the like, the surfaces being slightly softened as by a solvent or heat, or both, as may be necessary during their treatment but not to such an extent as would relax the material and alter the previously provided orientation and birefringence. The embossing procedure is preferably performed in a direction along that of the optic axis, to facilitate preservation of the given orientation. Accordingly, the lenticules, as illustrated, are generally cylindrical with their axes extending parallel to the optic axis. As will be apparent and explained in further detail, below, the lenticules play a major role in the predetermined separation and focusing of the respective rays. While lenticular means of the type described constitute one preferred configuration, they may be so formed as to extend in other directions of the sheet or even have a spherical shape, provided that their refractive characteristics are properly chosen and the birefringence of the material is suitable. Alternatively, the lenticules may be formed by a grinding and polishing procedure or the sheet may be stretched or otherwise treated for orienting its molecules after the lenticules have been formed thereon.

After completion of the surfacing of the birefringent layer 16 and either prior to or after its orientation, the isotropic layers 14 and 18 are assembled therewith or formed thereon by any appropriate method such as by casting them in liquid form on the preformed layer 16. Assuming that the material of layers 14 and 18 is not of a type to cause any disturbing double refraction of light rays when solidified and subjected to mechanical stress, as by stretching, the stretching and desired molecular orientation of layer 16 may be accomplished after casting and solidifying layers 14 and 18 on its surfaces, the entire sheet 10 then being stretched as a unit. Or, the layers 14 and 18 may be cast on layer 16 after orientation of the latter. Alternatively, and again assuming layers 14 and 18 to be substantially incapable of becoming birefringent when stressed, they may be preformed so as to have the lenticular surfaces shown, superimposed in correctly spaced relation, the birefringent layer 16 formed therebetween in a fluid state and solidified, and the entire unit then stretched. In a further modification, the layers 14 and 18 may be preformed and assembled with layer 16, in either a bonded or non-bonded relation therewith, after the layer 16 has been treated to acquire a proper birefringence.

It has been noted with reference to FIGURE 1, that the lenticules 16a and 16b are relatively offset from left to right, that is transversely of the sheet 10, so that the vertices of lenticules 16a are optically aligned with the longitudinal edges of intersections of lenticules 16b. While the lenticules 16a and 16b are shown as being spherical and of similar radii of curvature it will be understood that neither of these conditions is essential, per se, the choice depending in general upon the directions in which the rays are required to be refractured, the extent of their travel in said directions, and such factors as the refractive indices and thicknesses of the layers.

The collimated beams 12, emanating, for example, from a light source and reflector of a headlamp (not shown) and normally incident upon the isotropic layer 14, are transmitted without deviation through the latter to the converging cylindrical lenticules 16a of birefringent layer 16. At layer 16 each beam is resolved into two components, that is an ordinary or O ray 12a and an extraordinary of E ray 12b. Bearing in mind that the refractive index of isotropic layer 14 has been given as 1.5 and the refractive indices of birefringent layer 16 as 1.5 and 1.7, let it be assumed that the 1.7 refractive index applies to the components 12a which, for purposes of illustration, will be considered the ordinary rays vibrating substantially at right angles to the optic axis. Inasmuch as these rays have a refractive index which is higher than that of layer 14, which precedes layer 16 in order of their travel, they are refracted by lenticules 16a so as to converge generally toward a theoretical focal plane, not shown. The rays 12a pass through isotropic layer 18 without deviation inasmuch as their refractive index of 1.7 and that of layer 18 are substantially identical. The components 12b which in this instance are taken as the extraordinary rays vibrating in a plane passing through or parallel with the optic axis and having a refractive index of 1.5 identical to that of the preceding isotropic layer 14, are not refracted by the lenticules 16a because of this similarity of respective refractive indices. However, the diverging or negative lenticular surface 16b constitutes, in effect, a converging lenticular surface of isotropic layer 18, the components 12b thereby being refracted convergently toward the aforesaid theoretical focal plane. As described, the layer 16 is negatively birefringent inasmuch as the refractive index of the E ray is represented as less than that of the O ray, but a reverse condition is possible. The rays 12a and 12b, generated in birefringent layer 16, are plane polarized, their vibration directions being at 90° to one another as indicated. The rays are thence transmitted without alternation of their state of polarization with their vibrational planes normal to one another.

Either the E or the O ray, or both, may be selectively treated, as by passing them through retardation materials, to provide their vibrations in a single azimuth as will be described below. Even without such treatment and a non-uniformity of vibration directions, the sheet material of FIGURE 1 has certain uses such, for example, as for illumination purposes where it is desired to polarize the light partially in a given direction or for any function wherein transmission of a large part of the incident light is of importance but wherein completely uniform polarization throughout a given area is not essential. While the entering rays 12 are shown as collimated at 90° to the plane of the sheet, a slight departure from this condition, from left-to-right in the drawing, can exist without preventing operation of the device of FIGURE 1 or of others illustrated herein and a wide deviation therefrom may exist in a direction along the axes of the lenticules.

Consistent with obtaining an operational refraction or non-refraction of rays generally similar to that shown in FIGURE 1, the several layers may be formed of substantially any materials having suitable refractive indices, transparency and physical or mechanical properties such as thermal stability, flexibility or adhesion. Thus, for example, layer 14 may be composed of any of such materials as tetrofluoroethylene, vinyl acetate, cellulose acetate butyrate, an acrylic, glass, etc. Layer 16 may be a sodium nitrate crystal plate having indices of refraction of 1.587 and 1.336 or a calcite crystal plate having indices of 1.658 and 1.486. Layer 18 may be a second sheet of polyethylene terephthalate which has been rendered birefringent but which has its optic axis or direction of molecular orientation at 90° to that of layer 16, it being understood that its lenticular surface would match with that of layer 16 at 16b. In a further modification, assuming layer 16 to be birefringent and have suitable indices of refraction, the layer 18 may be composed of a material such as polystyrene, polyvinyl carbazole or glass, the choice depending, of course, on the deviation or non-deviation of significant rays obtained thereby and general suitability of the material.

Additional materials which can conceivably be used in forming layer 16 comprise cellulose acetate, ethyl cellulose, methyl cellulose, natural crystals of urea or some other minute birefringent particles. While a uniaxial type of birefringent layer is that principally conceived of and preferred, it is possible to employ a biaxial material for the purpose provided that the proper functional relation between the indices of refraction of the several layers is maintained. The indices of refraction of the several layers may further be controlled by predeterminedly altering their moisture or plasticizer content as, for example, the index may be lowered by adding moisture content and, in general by adding plasticizer. Where bonding substances or subcoats are employed in laminating preformed layers, a material used for such a purpose should have an index of refraction similar to that of one of the layers undergoing bonding to prevent unwanted reflection.

Figure 2:
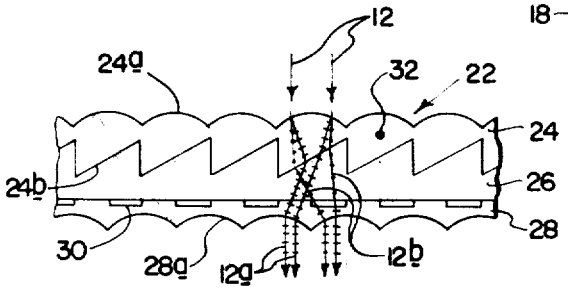

In FIG. 2, an edge view of a fragment of a light polarizing sheet material 22 is shown. The sheet 22 differs functionally from that of FIGURE 1 in two important respects: first, the light emanating from the sheet is collimated and second, it is uniformly polarized. The sheet material 22 comprises a lenticulated and prismatic birefringent layer 24 having a lenticular surface 24a and a prismatic surface 24b, an isotropic layer 26 possessing a refractive index substantially intermediate of the upper and lower refractive indices of the birefringent layer, an isotropic layer 28 comprising a plurality of diverging lenticules 28a, and a plurality of half-wave retardation strips or plate-like elements 30 positioned intermediate of the surfaces of isotropic layers 26 and 28. Layer 28 has a refractive index substantially identical to that of layer 26. For convenience of illustration, indices of refraction similar to those of FIGURE 1 are employed in FIG. 2 and will also be used for a similar reason in the succeeding illustrations. Accordingly, the refractive indices of the birefringent layer 24 may be taken as 1.5 and 1.7. The index of refraction of both layers 26 and 28, however, is intermediate of the two indices of layer 24, and thus is approximately 1.6. Layers 26 and 28 may be provided independently and bonded together by a bonding composition having an index of refraction similar to that of the layers, namely 1.6, or the layer 28 may be coated or cast on layer 26 after attachment of retardation elements 30 to the latter the lenticulated surface 28a then being formed as by an embossing procedure.

Materials suitable for composition of the several layers are similar to those serving generally like functions in the device of FIGURE 1. The forming of birefringent layer 24 is achieved in a manner such as that previously set forth relative to layer 16 of FIGURE 1, its birefringence being provided, for example, by an application of mechanical stress in a direction normal to the plane of the paper and the contours of the surfaces 24a and 24b being effected by embossing plates, wheels, or the like. The lenticular and prismatic surfaces 24a and 24b extend in directions normal to the plane of the paper. The angular slope of prismatic elements of the surface 24b may appropriately be disposed at 45° to the vertical, although some deviation from this angle is permissible. The optic axis is indicated at 32 and, as shown, is parallel to the longitudinal dimension or direction of the cylindrical lenticules of surface 24a and the longitudinal direction of the prismatic elements of surface 24b. Layer 26 may, appropriately, be cast on layer 24, solidified, and retardation elements 30 then applied to its exposed surface.

The half-wave retardation plates 30 are in the form of strips extending longitudinally of the sheet, parallel to the lenticular elements 24a and the prismatic elements 24b, merely the ends thereof being shown. The strip elements 30 are, appropriately, composed of a material similar to that employed in forming birefringent layer 24 as, for example, of polyethylene terephthalate or of polyvinyl alcohol. The chosen thickness of the retardation elements 30, in conjunction with the direction of an optic axis thereof provides a one-half wavelength retardation of incident polarized rays. The optic axis of elements 30, although not shown because of the dimensional limitation in the drawing, is to be assumed as being in the plane of the elements 30 and at approximately 45° to the longitudinal direction of the sheet, that is, in the example shown, at 45° to the optic axis 32 of layer 24. The retardation elements 30 may be provided, for example, by cutting strips from a birefringent sheet having a 45° molecular orientation, namely, a sheet of the type described in U.S. Patent No. 2,505,146. Or, they may be screen-like linear or otherwise shaped retardation portions formed in a sheet in which the molecular orientation of the areas surrounding or contiguous with said portions has been omitted or destroyed.

In production, the layer 26 is then solidified and the retardation elements 30 are affixed thereto. Alternatively, a preformed sheet containing the retardation elements or portions is thus affixed. Following this procedure, the layer 28 is cast on the solidified layer 26 and the diverging lenticular elements of surface 28a are embossed on the latter, care being exercised to prevent the introduction of any birefringence into layers 26 and 28. Or, retardation elements 30 may be located on the external surface 28a. As described relative to FIGURE 1, further latitude as to which layer is formed first and how the succeeding layers are produced is possible. Considerations previously mentioned as to the choice of materials which relate to the production or prevention of birefringence in any layer are also applicable with respect to the structure of FIG. 2.

In operation, the entering collimated beams 12 are convergently refracted at the lenticular faces 24a of birefringent layer 24 and are resolved into two components, namely, ordinary rays 12a and extraordinary rays 12b The ordinary rays, having a refractive index of 1.7, are refracted at prismatic surfaces 24b of layer 26 having a refractive index of 1.6, are directed through the interstices between retardation elements 30, and are collimated by the diverging lenticular elements 28a. The extraordinary rays 12b, having a refractive index of 1.5 are also refracted at prismatic surfaces 24b, are directed through retardation elements 30, whereat their vibration directions are rotated so as to have the same azimuth as the ordinary rays, and are collimated upon emergence by diverging lenticules 28a.

Figure 3:
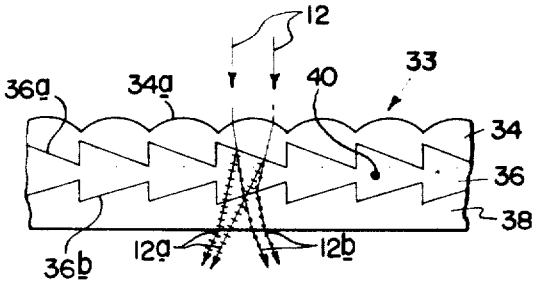

A modified light polarizing film or sheet structure 33 is shown in FIG. 3 which provides a wide separation of the emergent light rays. The sheet includes an isotropic lenticular entrance layer 34, a birefringent pristmatic intermediate layer 36 and an isotropic exit layer 38. Layer 34 may, for example, have a refractive index of 1.5, layer 36 refractive indices of 1.5 and 1.7, and layer 38 a refractive index of 1.7. The layers may be composed of light-transmitting materials similars to those described with respect to FIGS. 1 and 2 and formed by generally similar methods. A preferred method contemplates preforming, molecularly orienting and surface contouring layer 36, then applying layers 34 and 38 as a coating solution and surfacing these layers to provide the finished sheet structure. The optic axis is shown at 40.

The collimated entering beams 12 are refracted convergently at lenticular surface 34a, and are resolved into ordinary and extraordinary rays 12a and 12b, respectively, by birefringent layer 36. The ordinary rays 12a having, as noted, a refractive index of 1.7, are refracted at prismatic entrance surface 36a but pass without deviation from prismatic exit surface 36b through layer 38, the latter having a similar refractive index, and are again refracted upon emergence. The extraordinary rays 12b, having, as mentioned, a refractive index of 1.5 pass straight through birefringent layer 36, are refracted at layer 38, and again refracted upon emergence.

Figure 4:
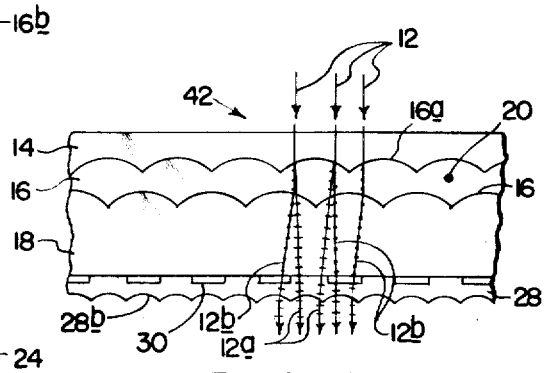
FIGS. 2 through 7 are diagrammatic fragmentary edge views of modification of the light polarizing sheet material of the invention.
Figure 5:
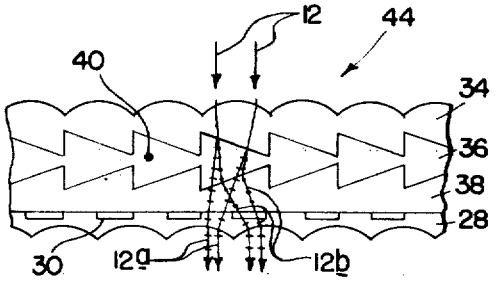

FIGS. 4 and 5, illustrating light polarizing devices 42 and 44, constitute modifications of FIGS. 1 and 3, respectively, in which, additionally, certain of the polarized rays are retarded so as to vibrate in a direction similar to that of non-retarded rays to produce a uniform azimuth of vibration and in which the emergent rays are collimated. The manner of performing these retardation functions has already been described in detail with respect to FIG. 2 and will, therefore, not be repeated, excepting that in FIG. 4 a modified type of lenticulated exit face 28b is employed for collimating the emergent rays. The refracted index of layer 28 is to be understood as similar to that of the preceding layer in order of traversal of the light rays, in both instances. The designations 12a and 12b are again used to denote the ordinary and extraordinary rays. Although not so shown, the curve of lenticules 16b may actually be steeper than that of lenticules 16a to obtain the convergence necessary for proper focusing and collimation purposes in a sheet material of the desired thickness as, for example, one in which layer 18 is much thinner than that illustrated.

Figure 6:
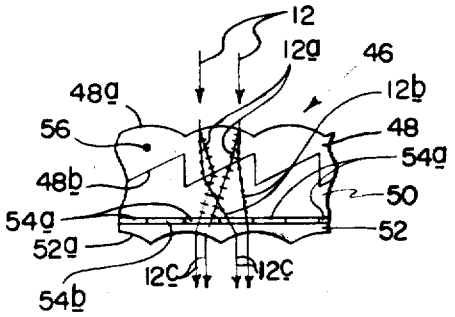
Figure 7:
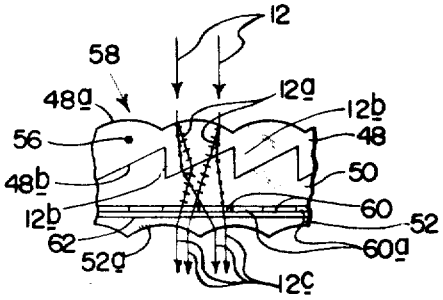

In FIGS. 6 and 7 there are shown two constructions of the present invention which are adapted to provide circularly polarized light. The device 46 of FIG. 6 comprises lenticulated and prismatic birefringent layer 48, having a lenticular surface 48a and a prismatic surface 48b, an isotropic layer 50 possessing a refractive index substantially intermediate of the upper and lower refractive indices of the birefringent layer, an isotropic layer 52 comprising a plurality of diverging or negative lenticular elements 52a, and a plurality of laterally-abutting, elongated, quarter-wave retardation plate or strip elements 54a and 54b positioned intermediate of the isotropic layers 50 and 52 and preferably initially bonded to one of layers 50 and 52, prior to application of layer 52. Birefringent layer 48 may be assumed, for purposes of illustration, to have refractive indices of 1.5 and 1.7. Again, for an illustrative purpose, the O ray is assigned the 1.7 refractive index and the E ray the 1.5 refractive index. The optic axis of layer 48 is shown at 56. Layers 50 and 52 both have an index of refraction which is intermediate those of layer 48, namely 1.6.

Further referring to FIG. 6, the materials employed and method of manufacturing the device are generally similar to those already desscribed. The quarter-wave retardation elements 54a and 54b distinguish from retardation elements previously shown, however. They include two sets of differentially molecularly oriented transparent strips, the strips of one set alternating with those of the other. Thus, for example, each strip 54a of one set is molecularly oriented at 45° to its longitudinal dimension in a counterclockwise direction and each strip 54b of the other set is molecularly oriented at 45° to its longitudinal dimension in a clockwise direction, the respective directions of orientation thus being 90° apart. The incident beams 12 are resolved into plane polarized O rays 12a and E rays 12b vibrating at 90° to one another at birefringent layer 48. Both types of rays are refracted by isotropic layer 50 so as to be selectively directed to assigned quarter-wave retardation elements 54a and 54b.

Continuing the description of FIG. 6, the retardation elements 54a and 54b convert the plane polarized O rays 12a and E rays 12b to uniformly circularly polarized emergent rays 12c. The rays 12c are either left-handedly or right-handedly circularly polarized depending upon whether the quarter-wave retardation strips are arranged so that the O rays are incident upon those molecularly oriented at 45° to the longitudinal dimension in a counterclockwise or clockwise direction. As shown, the emergent rays are collimated by the negative lenticules 52a, although the latter can be omitted where collimation is not essential.

A fragment of a circularly light polarizing sheet material 58, which is a modification of the sheet material 46 of FIG. 6, is shown in FIG. 7. The device distinguishes from the device 46 in the structure of retardation elements 60 and 62. Elements 60 comprise a plurality of laterally-spaced, elongated, half-wave retardation strips. The spaces 60a, lying laterally between elements 60, are of approximately similar width thereto and are preferably occupied by a bonding substance of proper refractive index as, for example, that employed to attach the strips 60 to the layer 50. Element 62 is a single, uniform quarterwave plate or film, coextensive with the entire area of the sheet material 58. Transmittal and polarization of the light rays by layers 48 and 50 has been described relative to FIG. 6. As shown, the plane polarized O and E ray components 12a and 12b, respectively, are vibrating in directions at 90° to one another. The half-wave retardation elements 60 serve to rotate the vibration plane of the O components 12a so as to cause them to be plane polarized in the azimuth of the E components. The quarter-wave plate 60, having an optic axis disposed at 45° to the aforesaid polarizing direction, then circularly polarizes the rays which are collimated, by lenticular means 52a, the latter being omitted where collimation is not desired.

Figure 8:
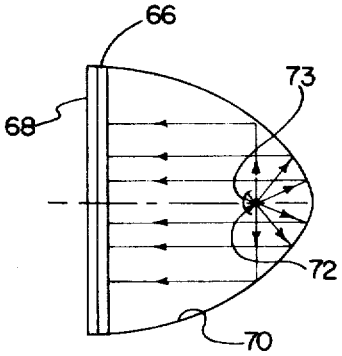
FIG. 8 is a diagrammatic side view of a headlamp of an automotive vehicle incorporating any one of the light polarizing sheet meterials of FIGS. 1 through 7.
Figure 9:
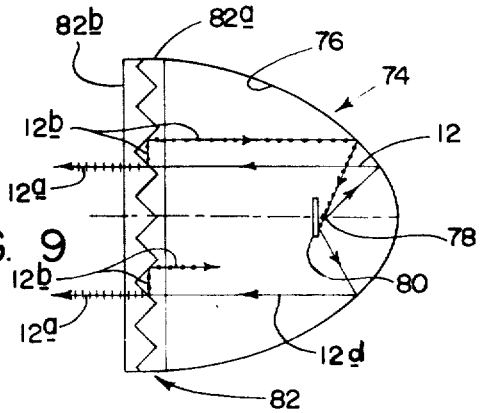
FIG. 9 is a diagrammatic side view of an automotive vehicle headlamp which includes a modified light polarizing filter of the invention.

FIGS. 8 and 9 illustrate incorporation of the high transmission light polarizers of the present invention in a lamp assembly such as the headlamp of an automotive vehicle. FIG. 8 represents, diagrammatically, a headlamp 64 including a sheet polarizer 66 which may be of any of the types shown in FIGS. 1–7, a protective glass face plate 68, a parabolic mirror 70, a filament 72 and a specularly reflecting curved plate 73. As shown, the mirror is so contoured as to produce collimation of the light beams reflected toward and incident upon the polarizing sheet 66 at approximately 90°, the plate 73, located at the focus of filament 72, serving both to reflect beams toward mirror 70, where they are collimated, and to shield the sheet 66 from diffused rays from the filament.

In FIG. 9 there is shown a lighting device such as headlamp 74 which includes a specularly reflecting parabolic mirror 76, a filament 78, a diffusely reflecting plate element 80 and a light polarizing sheet material 82. The light polarizing element 82 includes a birefringent prismatic layer 82a and an isotropic layer 82b, the refractive index of the latter matching a chosen one of the indices of refraction of the birefringent layer. Thus, for example, layer 82a may have refractive indices of 1.5 and 1.7 and layer 82b a refractive index of 1.5. An unpolarized collimated beam 12, upon entering birefringent layer 82a, is resolved into O and E components 12a and 12b, as previously described. The prism elements of layer 82a are so formed and disposed relative to the incident collimated beam 12 that the E ray 12b is reflected rearwardly to the parabolic mirror 76, is reflected to diffusely reflecting element 80, whereat it is depolarized, is reflected to mirror 76 and thence to light polarizing sheet material 82 as a second collimated unpolarized beam 12d. The prism elements may, for this purpose, appropriately be prisms or so-called hollow corner cubes which have the characteristic of reflecting collimated light rays in the direction whence they came. The O ray 12a is transmitted without deviation straight through layer 82b which matches its refractive index. This procedure repeats itself, ad infinitium, it being apparent that eventually substantially all of the light from source 78 is transmitted in the form of collimated O rays having a uniform azimuth of polarization.

Figure 10:
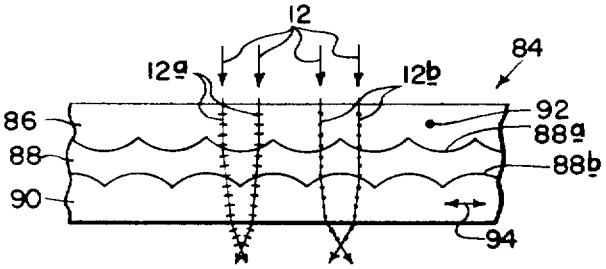
FIG. 10 is a diagrammatic fragmentary edge view of another modification of a light polarizing sheet material of the invention.

The modification of FIG. 10 illustrates a multilayer lenticulated light polarizing device 84 comprising birefringent layers 86 and 90 composed, for example, of polyethylene terephthalate and an isotropic layer 88 formed from a suitable, transparent material such as cyclohexylmethacrylate. The indices of refraction of both layers 86 and 90 may be taken as 1.52 and 1.78 and that of layer 88 as 1.52 Layer 88 has lenticulated surfaces 88a and 88b, the lenticules extending at 90° to the plane of the paper and being offset laterally with respect to one another as shown so that the vertices of one set are optically aligned with the joining lines of the other. Layer 86 has an optic axis indicated at 92 and layer 90 an optic axis at 94, the directions thereof being relatively disposed at 90° to one another. Rays 12a and 12b represent two components of an entering collimated beam 12 disposed at 90° to the plane of the device, namely, an ordinary or O ray 12a and an extraordinary or E ray 12b, as provided by the birefringent layer 86. They are shown as separate entering rays to better illustrate the respective path directions. Assuming the ray component 12a to have the higher refractive index of 1.78 and component 12b to have the lower refractive index of 1.52, component 12a is refracted at surface 88a but passes straight through layer 90 by reason of the relation of its vibration direction to the optic axis 94 and identity with the higher index of said layer. In turn, component 12b passes straight through layer 88 but is refracted at layer 90 due to the relation of its vibration direction to the optic axis 94 and identity with the lower index of layer 90. Retardation plates or strips and a lenticulated exit face of the types mentioned in connection with the previously described structures may be employed for providing a uniform direction of polarization and collimation, respectively, of light rays transmitted by the device.

Figure 11:
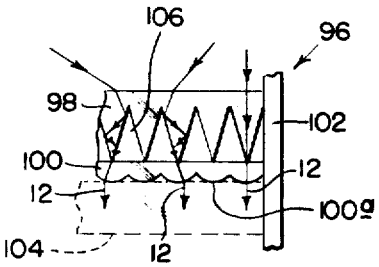
FIG. 11 is a diagrammatic fragmentary edge view of collimating means for incorporation with the various light polarizing devices of the invention.

In FIG. 11 there is shown an example of a light-transmitting structure 96 which may be incorporated with any of the sheet-like light polarizing devices illustrated herein for collimating the entering light beams. It includes a plurality of prismatic elements 98, a layer 100 comprising positive lenticules 100a and mounting means 102 such as a rim, frame, or the like, for holding the elements in assembled relation. A light polarizing device or sheet, representative of any of the types comprised by the present invention, is indicated by the dotted outline 104. The refractive indices of elements 98 and 100 are, preferably, similar. The prismatic elements 98 are in the form of elongated wedge-like or ridged strips or, alternatively, they may be conical. The area 106 between each pair of elements 98 is an air space. The apexes of elements 98 and the vertexes of elements 100a may be considered as either bonded to the plane surfaces of elements 100 and 104, respectively contiguous therewith, or they may all be held together entirely through the medium of mounting strip 102. As shown, light rays incident upon collimating means 96 at various angles other than the normal are refracted at the entering surface, are reflected at the internal surfaces of prismatic elements 98, and again refracted by the lenticules 100a so as to assume a collimated condition and to be transmitted substantially at 90° to the plane of the assembly.

Although collimating means has been shown only at the exit face of a light polarizing sheet which includes a retardation element, it should be understood that either the collimating means or the retardation element may be included without the presence of the other. A modification of the structures described herein permits the use of two adjacent birefringent layers to obtain higher values of birefringence instead of the adjacent birefringent and isotropic layers shown. Where such a construction is used each of the birefringent layers should have one matching index of refraction with respect to the other.

Figure 12:
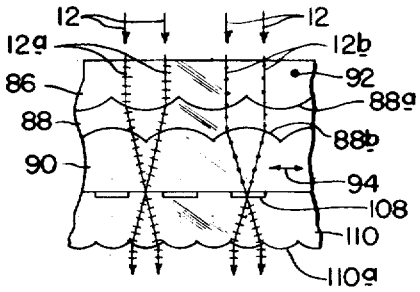
FIG. 12 is a diagrammatic fragmentary edge view of a further modification of a light polarizing device of the invention.

Further modifications of the structures described herein are, of course, possible within the scope of the invention. Thus, the curve of the lenticules 16b in FIG. 4 may be made steeper as, for example, to provide an exact focus of the ray components at a given plane within the structure such as the focus of ray component 12a at retardation strips 30. In such an instance the exit lenticules would be of a positive or converging type, if included for collimation purposes. An example of a device wherein focus is at the retardation strips and positive lenticules are employed at the exit surface is shown at FIG. 12. The structure is similar to that of FIG. 10, with the addition of half-wave retardation strips 108, layer 110 having a refractive index of 1.7 and the positive lenticular surface 110a.

Further referring to general structural considerations, lenticules, where positive, may, for example, be of a spherical, cylindrical or elliptical form, depending upon the optical requirements, and the negative lenticules may be of any chosen fluted or concave contour which serves the intended function. Again, other prismatic contours and slopes may be employed as long as they contribute to the operations described. Wherein lenticular collimating exit surfaces have been shown, in FIGS. 2, 4 and 5, in conjunction with retardation strips 30, it would, of course, be permissible to eliminate said lenticular surfaces in favor of a plane surface with the strips properly arranged thereon for interception of the rays if collimation were not essential, or to collimate the rays internally through, for example, the use of an exit layer 28 of relatively different index, functionally configurated continguous surfaces of layer 28 and the preceding layer, or both. Similar considerations relate to the showings of FIGS. 6 and 7.

What is claimed is:

1. A multilayer light transmitting device for receiving normally incident unpolarized collimated light and providing a large proportion thereof in the form of polarized light, comprising, in assembled bonded relation, an isotropic entrance layer having a plane entering surface, a negatively lenticulated exit surface and a given index of refraction, an isotropic exit layer spaced from said entrance layer having a positively lenticulated entering surface, a plane exit surface and a given index of refraction which is different from that of said entrance layer, and a birefringent layer positioned intermediately of and bonded to facing surfaces of said entrance and exit layers, said birefringent layer having a positively lenticulated entering surface bonded to said negatively lenticulated exit surface bonded to said positively lenticulated entering surface of said exit layer, and given relatively low and high indices of refraction each substantially matching a separate one of the indices of said isotropic layers, the lenticules of said entrance and exit layers being arranged in laterally offset relation so that, when taken in the general direction of light transmittal, the vertices of the lenticules of one layer are opposite the lenticular joining extremities of the other, the isotropic property and plane entering surface of said entrance layer providing transmission of said normally incident collimated beams therethrough without deviation, the doubly refractive property and lenticular structure of said intermediate birefringent layer resolving each entering beam into O and E components with that component matching the index of said entrance layer propagated in a substantially unaltered direction through said birefringent layer, then refracted upon entering the positively lenticulated exit layer having a different refractive index and again refracted upon emerging from the planar exit surface of said exit layer toward a given focal plane, while that component matching the index of said exit layer is refracted in said intermediate birefringent layer, is propagated in a substantially unaltered direction in said exit layer, and is again refracted upon emerging from said exit layer toward said focal plane, the offset relation of the lenticules of the respective layers contributing to the proper focus of the components.

2. A multilayer light transmitting device for receiving normally incident unpolarized collimated light and providing a large proportion thereof in the form of linearly polarized light, comprising, in assembled and bonded relation, an isotropic entrance layer having a positively lenticulated entering surface, a prismatic exit surface and a given index of refraction, an isotroipc exit layer spaced from said entrance layer having a prismatic entering surface, a plane exit surface and a given index of refraction different from that of said entrance layer, and a birefringent layer positioned intermediate of and bonded to facing surfaces of said entrance and exit layers, said birefringent layer having a prismatic entering surface bonded to said prismatic exit surface of said entrance layer, a prismatic exit surface bonded to said prismatic entering surface of said exit layer, and given relatively low and high indices of refraction, each substantially matching the index of a separate one of said isotropic layers, the prism components of said entrance and exit layers being optically aligned in the general direction of light transmittal, the lenticulated entering surface of said entrance layer providing refraction of said normally incident collimated beams, the doubly refractive property and prismatic structure of said intermediate birefringent layer resolving each entering beam into O and E components with that component matching the index of said entrance layer propagated in a substantialy unaltered direction through said birefringent layer, then refracted at the prismatic entering surface of said exit layer having a different refractive index and again refracted upon emerging from the planar exit surface of said exit layer toward a given focal plane, while that component matching the index of said exit layer is refracted in said intermediate birefringent layer, is propagated in a substantially unaltered direction in said exit layer, and is again refracted upon emerging from said exit layer toward said focal plane.

3. A multilayer light transmitting device for receiving normally incident unpolarized collimated light and providing a large proportion thereof in the form of linearly polarized collimated light, comprising in assembled and bonded relation and in order of light transmittal, a birefringent first layer having a positively lenticulated entrance surface, a prismatic exit surface and given relatively low and high indices of refraction, an istotropic second layer having a prismatic entrance surface mating with and bonded to said exit surface of the first layer, a planar exit surface and a given refractive index substantially intermediate of said refractive indices of the first layer, a plurality of equally spaced half-wave retardation elements disposed on and bonded to said planar exit surface of the second layer, and a third isotropic layer bonded both to said retardation elements and to uncovered intervening portions of said planar exit layer lying between said retardation elements, said third layer also having a refractive index substantially intermediate of said indices of said first layer and having a negatively lenticulated exit surface, the doubly refractive property of said first layer resolving each entering beam into O and E components refracted in different directions with vibration directions disposed relatively at 90°, said second layer having a refractive index and prismatic structure providing the refraction of a given one of said O and E components so as to be incident and transmitted by said retardation elements while refracting the other of said components so as to be incident and transmitted by said intervening portions of said exit surface, thereby providing a rotation of the vibration direction of said components transmitted by said retardation elements to conform with that of said other components, and said third layer providing at said negatively lenticulated exit surface thereof the collimation of both said components upon emergence from said device.

4. A device, as defined in claim 3, wherein the device is in the form of a sheet-like element, wherein the lenticules, prisms and retardation components thereof are elongated and are disposed in generally parallel relationship across said element and wherein the optic axis of said birefringent layer extends in the plane of said element in a direction substantially parallel with said components.

5. A device, as defined in claim 4, wherein the width of said lenticules and prisms of said first, second and third layers is similar, wherein the joining line of said lenticules of the first layer and the joining lines of said prisms are optically aligned and the joining lines of said lenticules of the third layer are substantially aligned with the vertices of said lenticules of the first layer and with the midportions of said prisms, the aforesaid alignment contributing to the proper refraction of components and collimation thereof.

6. A multilayer light transmitting device for receiving normally incident unpolarized collimated light and providing a large proportion thereof in the form of linearly polarized light, comprising, in assembled bonded relation, a birefringent entrance layer having a plane entering surface, a positively lenticulated exit surface, given relatively low and high indices of refraction and an optic axis lying in the plane thereof and disposed in a given direction, a birefringent exit layer spaced from said entrance layer having a positively lenticulated entering surface, a plane exist surface, given indices of refraction similar to those of said entrance layer and an optic axis in the plane thereof but disposed in a direction at 90° to that of the optic axis of said entrance layer, and an isotropic layer positioned intermediately of and bonded to facing surfaces of said entrance and exit layers, said isotropic layer having a negatively lenticulated entering surface bonded to said positively lenticulated exit surface of said entrance layer, a negatively lenticulated exit surface bonded to said positively lenticulated entering surface of said exit layer, and an index of refraction matching the low index of said birefringent layers, the lenticules identified with said entrance and exit layers being relatively arranged so that, when taken in the general direction of light transmittal, the vertices of the lenticules of one layer are opposite the lenticular joining extremities of the other, the doubly refractive property of said entrance layer resolving each entering beam into O and E components having different transmission and vibration directions with that component matching the index of said intermediate isotropic layer being propagated in a substantially unaltered direction through the latter, then refracted upon entering the birefringent exit layer and again refracted upon emerging from the planar exit surface of said exit layer toward a given focal plane, while that component differing in index from the index of said intermediate isotropic layer is refracted in said layer, is propagated in a substantially unaltered direction in said exit layer, and is again refracted upon emerging from said exit layer toward said focal plane.

7. A multilayer light-polarizing sheet material for receiving normally incident unpolarized collimated light and providing a large proportion thereof in the form of linearly polarized collimated light, comprising, in assembled bonded relation and in order of light transmittal, an isotropic first layer having a plane entrance surface, a negatively lenticulated exit surface and a given index of refraction, a birefringent second layer having a positively lenticulated entrance surface mating with and bonded to said exit surface of the first layer, a negatively lenticulated exit surface and given relatively low and high indices of refraction with an optic axis in the plane thereof, an isotropic third layer having a positively lenticulated entrance surface, a plane exist surface and a given index of refraction, a plurality of equally spaced half-wave retardation elements bonded to said last-named exit surface, an isotropic fourth layer having an entrance surface juxtaposed with and bonded to said last-named exit surface and said retardation elements and a negatively lenticulated exit surface, said first layer having an index of refraction substantially matching one of the refractive indices of said second layer and said third and fourth layers having identical refractive indices matching the other index of said second layer, the lenticules and retardation elements of said layers being elongated so as to extend across said sheet material in generally parallel relation, the lenticules identified with said first and third layer being of similar width and relatively offset and the lenticules of said fourth layer being of a lesser width and steeper curve than those of the first and third layers, the isotropic property and plane entrance surface of said first layer providing transmission of said normally incident collimated beams therethrough without deviation, the doubly-refractive property of said second layer resolving each entering beam into O and E components with their vibration directions at 90°, each component which matches the index of said entrance layer being propagated in a substantially unaltered direction through said birefringent layer, refracted upon entering said third layer, having its vibration direction rotated so as to conform with that of the other of said components by passage through and retardation by a half-wave retardation element, being transmitted without directional change by said fourth layer, and refracted so as to be collimated upon emergence from the negatively lenticulated surface of the last-named layer, the other component being refracted in said second layer, transmitted so as to bypass said retardation elements, passing without deviation through said third and fourth layers, and refracted upon emerging from the negatively lenticulated surface of said last-named layer so as to be collimated with said above-mentioned collimated components, the given offset relation and relative curves of said lenticules contributing to said refraction and collimation of said components.

8. A multilayer light-polarizing sheet material for receiving normally incident unpolarized collimated light and providing a large proportion thereof in the form of collimated linearly polarized light, comprising, in assembled bonded relation and in order of light transmittal, an isotropic first layer having a positively lenticulated entrance surface, a prismatic exit surface and a given index of refraction, a birefringent second layer having a prismatic entrance surface mating with and bonded to said prismatic exit surface of the first layer, a prismatic exit surface and given relatively low and high indices of refraction with an optic axis in the plane thereof, an isotropic third layer having a prismatic entrance surface mating with and bonded to said prismatic exit surface of the birefringent layer, a plane exit surface and a given index of refraction, a plurality of equally spaced half-wave retardation elements bonded to said last-named exit surface, an isotropic fourth layer having an entrance surface juxtaposed with and bonded to said last-named exit surface and said retardation elements and a negatively lenticulated exit surface, said first layer having an index of refraction substantially matching one of the refractive indices of said second layer and said third and fourth layers having identical refractive indices matching the other index of said second layer, the lenticules, prisms and retardation elements of said layers being elongated so as to extend across said sheet material in generally parallel relation, the lenticules identified with said first and fourth layers being of similar width and relatively offset and said prism elements being of a width similar to that of said lenticules and aligned with the lenticules of said first layer, the lenticulated surface of said first layer providing refraction of said normally incident collimated beams, the doubly-refractive property and prismatic structure of said second layer resolving each entering beam into O and E components with their vibration directions at 90°, each component which matches the index of said entrance layer being propagated in a substantially unaltered direction through said birefringent layer, refracted upon entering said third layer, having its virbration direction rotated so as to conform with that of the other of said components by passage through a half-wave retardation element, being transmitted without directional change by said fourth layer, and refracted so as to be collimated upon emergence from the negatively lenticulated surface of the last-named layer, the other component being refracted in said second layer, transmitted so as to bypass said retardation elements, passing without deviation through said third and fourth layers, and refracted upon emerging from the negatively lenticulated surface of said last-named layer so as to be collimated with said above-mentioned collimated components.

9. A multilayer light polarizing sheet material for receiving normally incident unpolarized collimated light and providing a large proportion thereof in the form of uniformly circularly polarized collimated light, comprising, in assembled bonded relation and in order of light transmittal, a birefringent first layer having a positively lenticulated entrance surface, a prismatic exit surface, an optic axis disposed in a given direction in the plane thereof and given relatively low and high indices of refraction, an isotropic second layer having a prismatic entrance surface mating with and bonded to said exit surface of the first layer, a planar exit surface and a given refractive index substantially intermediate of said indices of the first layer, a third layer composed of a plurality of laterally disposed quarter-wave retardation elements bonded to said last-named exit surface, said elements having differential principal directions alternatively disposed angularly at plus and minus 45° with respect to said optic axis of said first layer, and a fourth isotropic layer having a planar entrance surface bonded to said retadation elements, a negatively lenticulated exit surface and a refractive index similar to that of said second layer and thus also intermediate of the refractive indices of said first layer, the lenticules of said first and fourth layers being laterally offset with respect to one another, the doubly refractive property of said first layer resolving each entering beam into O and E components refracted in different directions with vibration directions disposed relatively at 90°, the refractive index and prismatic structure of said second layer providing the refraction of said O and E components so as to be selectively incident said retardation elements having differential directions and provide a uniform circular polarization of said components, and said fourth layer causing at said negatively lenticulated exit surface thereof the collimation of said components so as to provide their emergence as uniformly circularly polarized light.

10. A multilayer light polarizing sheet material for receiving normally incident unpolarized collimated light and providing a large proportion thereof in the form of uniformly circularly polarized collimated light, comprising, in assembled bonded relation and in order of light transmittal, a birefringent first layer having a positively lenticulated entrance surface, a prismatic exit surface, an optic axis disposed in a given direction in the plane thereof and given relatively low and high indices of refraction, an isotropic second layer having a prismatic entrance surface mating with and bonded to said exit surface of the first layer, a planar exit surface and a given refractive index substantially intermediate of said fractive indices of the first layer, a third layer composed of a plurality of laterally spaced half-wave retardation elements bonded to said last-named exit surface with a plurality of isotropic elements lying therebetween, a fourth layer composed of a quarter-wave retardation element coextensive with and bonded to said half-wave retardation elements, and an isotropic fifth layer having a planar entrance surface bonded to said retardation elements, a negatively lenticulated exit surface and a refractive index similar to that of said second layer and thus also intermediate of the refractive indices of said first layer, the lenticules of said first and fifth layers being laterally offset with respect to one another, the doubly refractive property of said first layer resolving each entering beam into O and E components refracted in different directions with vibration directions disposed relatively at 90°, the refractive index and prismatic structure of said second layer providing the refraction of said O and E components so as to be selectively incident said half-wave retardation elements and the spaces therebetween providing a uniform linear polarization of said components in a given direction, said quarter-wave retardation element, by reason of its having a principal direction disposed at 45° to said direction of polarization, providing a uniform circular polarization of the light transmitted thereby and said third layer providing at said negatively lenticulated exit surface thereof the collimation of the circularly polarized light emerging therefrom.

*11. A multilayer light polarizing device having a plurality of interfaces between the layers thereof for receiving unpolarized light and transmitting a large proportion of said light in the form of polarized light rays comprising, in assembled bonded relationship:*

*layer means including a first one of said interfaces, which first interface is substantially nonrefractive of a first portion of said light rays having a given vibration azimuth but refractive of a second portion thereof having a vibration azimuth orthogonally disposed relative to that of said first portion, said first interface being bounded on at least one side by a birefringent layer having one index of refraction substantially equal to an index of refraction of a layer at the opposite side thereof and a second index of refraction differing therefrom, said first interface being configurated to refract said second portion of light rays into a plurality of spaced-apart components converging toward areas of substantial focus; and*

*layer means including a second one of said interfaces, which second interface is substantially nonrefractive of said second portion of light rays but refractive of said first portion thereof, said second interface being bounded on at least one side by a birefringent layer having one index of refraction substantially equal to an index of refraction of a layer at the opposite side thereof and a second index of refraction differing therefrom, said second interface being configurated to refract the aforesaid first portion of light rays into a plurality of spaced-apart components converging toward substantial focus at areas which are laterally interpositioned between said areas of focus of said second portion of light rays.*

*12. A multilayer light transmitting device for receiving normally incident unpolarized light and transmitting a large portion thereof in the form of polarized light comprising, in assembled bonded relationship:*

*a plurality of layers of optically clear materials arranged sequentially between entrance and exit surfaces of said device with interfaces between the layers,*

*means including a first one of said interfaces substantially unrefractive of a first proportion of light rays incident thereon having a given polarization azimuth but refractive of a second incident proportion of light rays having an opposite polarization azimuth, said first interface being bounded on one side by a homogeneous birefringent material having at least one index of refraction substantially equal to an index of refraction of the material on the opposite side of said interface and at least one index of refraction substantially dissimilar from any index of refraction of the material on the opposite side thereof,*

*said first interface being configurated to refract said second proportion of light into a plurality of spaced-*

*apart beam components converging toward substantial focus, and*

*means including a second one of said interfaces substantially unrefractive of said second proportion of light but refractive of said first proportion of light,*

*said second interface being bounded on one side by a homogeneous birefringent material having at least one index of refraction substantially equal to an index of refraction of the material on the opposite side of said interface and at least one index of refraction substantially dissimilar from any index of refraction of the material on the opposite side thereof,*

*said second interface being configurated to refract the aforesaid first proportion of light into a plurality of spaced-apart beam components converging toward substantial focus in areas intercalated between said first plurality of beam components.*

*13. The combination of claim 12 further comprising a plurality of retardation elements arranged to intercept*

*selected ones of said beam components to cause an optical rotation of the polarization azimuth thereof for rendering parallel the polarization azimuths of said first and second plurality of beam components.*

References Cited

The following references, cited by the Examiner, are of record in the patented file of this patent or the original patent.

UNITED STATES PATENTS

| | | | |
|---|---|---|---|
| 1,734,022 | 10/1929 | Short | 88—65 |
| 2,180,114 | 11/1939 | Land | 88—65 X |
| 2,270,535 | 1/1942 | Land et al. | 88—65 X |

DAVID H. RUBIN, *Primary Examiner.*

U.S. Cl. X.R.

240—9.5